United States Patent [19]

Metcalfe et al.

[11] 4,128,678

[45] Dec. 5, 1978

[54] HEAT INSULATING MATERIAL AND METHOD OF AND APPARATUS FOR THE MANUFACTURE THEREOF

[75] Inventors: Paul E. Metcalfe; Randall W. Rollo; Malcolm J. Stagg, all of Sarnia, Canada

[73] Assignee: Fiberglas Canada Limited, Toronto, Canada

[21] Appl. No.: 813,674

[22] Filed: Jul. 7, 1977

[30] Foreign Application Priority Data

Apr. 12, 1977 [CA] Canada .................................. 275977

[51] Int. Cl.² .............................................. C04B 43/02
[52] U.S. Cl. ..................................... 428/119; 156/197; 156/207; 156/254; 156/443; 156/510; 428/120; 428/902; 428/920
[58] Field of Search ..................... 428/119, 40, 55, 56, 428/85, 92, 93, 94, 95, 99, 112, 113, 119, 120, 182, 902, 920; 156/197, 207, 254, 443, 462, 510

[56] References Cited

U.S. PATENT DOCUMENTS

| | | | |
|---|---|---|---|
| 2,500,690 | 3/1950 | Lannan | 428/99 |
| 2,949,953 | 8/1960 | Di Maio | 428/99 |
| 3,010,508 | 11/1961 | Wilson | 156/254 |
| 3,012,923 | 12/1961 | Slayter | 156/30 |
| 3,738,884 | 6/1973 | Soehngen | 156/254 |
| 3,819,468 | 6/1974 | Sauder | 428/99 |
| 3,957,568 | 5/1976 | Abel | 156/254 |

*Primary Examiner*—Marion E. McCamish
*Attorney, Agent, or Firm*—Fleit & Jacobson

[57] ABSTRACT

Apparatus for and method of manufacturing a heat insulating material from an uncured, strip-shaped felt of fibres containing a heat hardenable bonding substance firstly form corrugations extending across the entire width of the uncured felt and following one another in succession along the length of the felt. The corrugated felt is then cured as a cured felt containing fibres extending in a serpentine array along the felt, and conveyed along a path of travel extending past a cutter having a cutting blade extending transversely across the path, whereby the felt is cut longitudinally into two partial felts, the corrugations being severed so that the fibres form U-shaped arrays disposed in succession along each of the partial felts. This fibre array provides compressive strength combined with flexibility, enabling the insulating material to be used on various pipe sizes.

11 Claims, 4 Drawing Figures

HEAT INSULATING MATERIAL AND METHOD OF AND APPARATUS FOR THE MANUFACTURE THEREOF

FIELD OF THE INVENTION

The present invention relates to pipe insulation material and apparatus for, and methods of, manufacturing heat insulating material from an uncured, strip-shaped felt of fibres containing a heat hardenable bonding substance.

DESCRIPTION OF THE PRIOR ART

At the present time, it is common practice to provide preformed cylindrical thermal insulation coverings in one, two or three pieces for hot and cold pipes, such coverings being commonly referred to as "pipe insulator sections".

Various production processes are employed for manufacturing such thermal insulation coverings. However, these prior methods have the disadvantage that the pipe insulator sections must each be shaped and dimensioned to closely fit a corresponding pipe outer diameter. This necessitates the manufacture of the pipe insulator sections in a plurality of different sizes, which necessarily results in correspondingly high manufacturing, storage and transportation costs.

Moreover, the storage and manufacturing costs of these prior art pipe insulator sections are further increased by the fact that, since the sections are rigidly preshaped to fit the pipes, packages containing the sections are necessarily bulky and wasteful of space.

It has also previously been proposed, for example in U.S. Pat. No. 2,949,953, issued Aug. 23, 1960 to V. DiMaio et al, and U.S. Pat. No. 3,012,923, issued Dec. 12, 1961 to G. Slayter, to provide a pipe insulation material in the form of a strip of fibrous material in which the fibres extend in the direction of the thickness, i.e. transverse to the length and the width, of the strip. Such pipe insulation material can be wrapped around a pipe so that the fibres of the insulation material extend substantially radially of the pipe.

However, as will be appreciated by those skilled in the art, fibrous insulating material has a greater resistance to the passage of heat therethrough in the direction transverse to the fibres than in the direction extending longitudinally of the fibres. Consequently, insulating material in which, when the material is installed on a pipe, the fibres extend radially of the pipe provides relatively poor heat insulation as compared to insulating materials in which the fibres extend transversely of the direction of heat flow.

The aforementioned U.S. Pat. No. 3,012,923 also proposes the manufacture of a fibrous heat insulating material by forming a series of corrugations or pleats in a mat of mineral fibres bonded to form a flexible mat, the mat being cured prior to the formation of the corrugations or pleats, and the latter being compacted, a backing sheet being adhered to one side of the corrugated mat to hold the corrugations together. This backing sheet forms the interior face of the insulating material, i.e. it is placed against the outer surface of a pipe when the insulating material is installed on the pipe. This prior insulating material has the disadvantage that, since the corrugations are not adhered or bonded to one another, the fibres in the regions of the corrugations or folds opposite from those regions which are adhered to the backing sheet expand and cause the insulating material to curl, which makes it difficult, if not impossible, to pack the insulating material in flat packages for shipment. Also, the provision of the backing sheet on the side of the insulating material which, in use, is adjacent the pipe to be insulated is disadvantageous firstly because the adhesive securing the backing sheet to the insulating material is exposed to the heat of the pipe, which may be sufficiently excessive to cause the backing sheet to cease to adhere to the corrugated mat, and secondly because a second, exterior jacket is required when the insulating material is in use to protect the insulating material, in accordance with normal practice in the art, from ambient moisture, dust etc. The on-side provision of the exterior jacket adds additional expense and unacceptably complicates the fitting of the insulating material to its pipe.

U.S. Pat. No. 2,500,690, issued Mar. 14, 1950 to G. M. Lannan, proposes apparatus for piling a mineral wool mat up on itself by a corrugating or successive looping in opposite directions of the mat, with the loops or corrugations extending transversely of the path of advancement of the mat, and then curing the mat. The purpose of this prior apparatus was to resist delamination or separation of the mat and to provide a more rigid and board-like mat. However, with the more advance mineral wool forming apparatuses presently in use, mats are formed which do not tend to delaminate. Moreover, rigid and board-like mats are completely unsuitable for pipe insulation, since they cannot be bent to conform to the exterior surfaces of pipes.

SUMMARY OF THE INVENTION

It is accordingly an object of the present invention to provide a novel and improved insulating material which is particularly useful for the insulation of large diameter pipes and which provides improved flexibility to facilitate the manufacture, storage, transportation and installation thereof, but which nevertheless retains sufficient thermal resistance.

It is a further object of the present invention to provide a pipe insulating material which can be packaged flat or in coiled form, as desired, for storage and transportation, and which is readily adaptable to various pipe diameters, especially large pipe diameters.

According to the present invention, there is provided a heat insulating material from an uncured, strip-shaped felt of fibres containing a heat hardenable bonding substance, the apparatus comprising means for forming in the uncured felt corrugations extending across the entire width of the felt and following one another in succession along the length of the felt; a felt curing section for applying heat to the corrugated felt to form a cured felt containing fibres extending in a serpentine array along the felt between opposite flat sides of the felt; means for longitudinally cutting the cured felt to separate the cured felt into two partial felts; and means for longitudinally conveying the felt along a path of travel extending past the cutting means; the cutting means comprising a cutting blade extending transversely across said path of travel, whereby the corrugations are severed so that the fibres form U-shaped arrays disposed in succession along each of the partial felts.

When this mat is in use, it is wrapped around a pipe with the lengths of the elongate felt sections extending in the longitudinal direction of the pipe and with the firstmentioned major surface of the mat positioned on the surface of the pipe. This, of course, required the mat to be curved into a cylindrical shape. Since the fibres can be more readily compressed in a direction perpendicular to their lengths than longitudinally of the fibres, and since the fibres at the major surface of the mat which lies at the inner side of the cylindrical shape extend perpendicular to that surface, i.e. radially of the pipe, the mat can be more readily compressed at that side than at the opposite major surface of the mat. This facilitates the flexing of the mat required to fit the mat closely around the pipe.

The fibres extending transversely of their elongate felt sections, are disposed transversely of the direction of heat flow to or from the pipe and therefore provide a greater resistance to such heat flow than do the radially extending fibres.

Also, according to the present invention, there is provided apparatus for manufacturing a heat insulating material from an uncured, strip-shaped felt of fibres containing a heat hardenable bonding substance, the apparatus comprising means for forming in the uncured felt corrugations extending across the entire width of the felt and following one another in succession along the length of the felt; a felt curing section for applying heat to the corrugated felt to form a cured felt containing fibres extending in a serpentine array along the felt between opposite flat sides of the felt; means for longitudinally cutting the cured felt to separate the cured felt into two partial felts; and means for longitudinally conveying the felt along a path of travel extending past the cutting means; the cutting means comprising a cutting blade extending transversely across the path of travel, whereby the corrugations are severed so that the fibres form U-shaped arrays disposed in succession along each partial felt. The formation of these U-shaped arrays of fibres has the advantage that the insulating material formed by the partial felts has a good compressive strength, which is provided by the resistance to compression afforded by the arms of the U-shaped arrays against forces acting in the longitudinal direction of such arms, i.e. perpendicular to the major surfaces of the partial felts. These arms also are compressible transversely of the arms, which provide the partial felts with good flexibility. In addition, the bridge portions of the U-shaped arrays, which extend generally parallel to those major surfaces, provide the partial felts with good tensile strength and good thermal resistance to the passage of heat in the direction extending perpendicular to the major surfaces.

The invention further provides a method of manufacturing a heat insulating material from an uncured, longitudinally advancing strip-shaped felt of fibres containing a heat hardenable bonding substance, which comprises the steps of forming in the uncured felt transverse corrugations extending across the entire width of the felt to the opposite longitudinal edges of the felt, compressing the corrugated felt to compact the corrugations, curing the compacted and corrugated felts to cure the bonding substance and flatten opposite major surfaces of the felt, whereby the felt is formed into a cured felt containing fibres extending in a serpentine array along the felt between said surfaces, and longitudinally cutting the cured felt in a plane extending transversely across the path of travel of the felt to separate the felt into two partial felts, whereby the corrugations are severed so that the fibres form U-shaped arrays disposed in succession along each of the partial felts.

BRIEF DESCRIPTION OF THE DRAWINGS

The invention will be more readily understood from the following description of a preferred embodiment thereof given, by way of example, with reference to the accompanying drawings, in which.

DESCRIPTION OF THE PREFERRED EMBODIMENT

Figure 1:
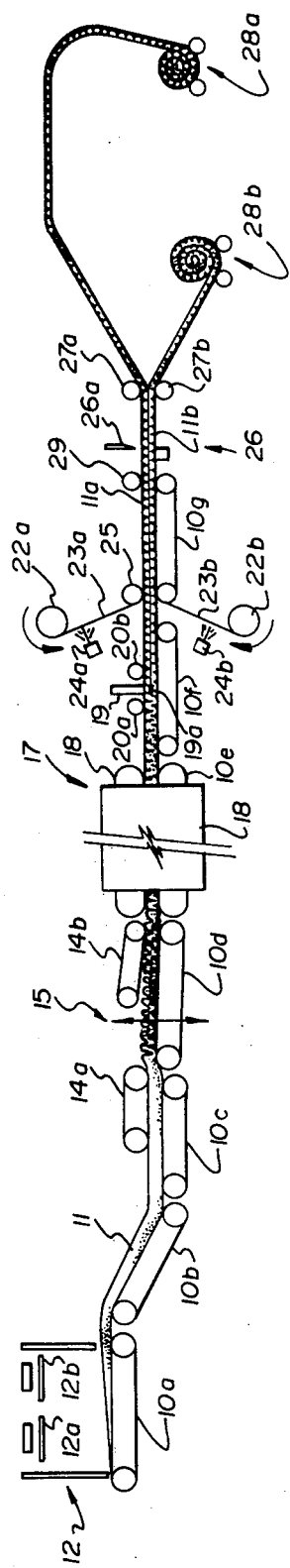
FIG. 1 shows a diagrammatic side view of a production line for manufacturing heat insulating material embodying the present invention.

The production line illustrated in FIG. 1 has a plurality of endless belt conveyors 10A to 10G for longitudinally advancing a strip-shaped felt 11 from a conventional felt forming hood indicated generally by reference numeral 12.

The forming hood 12 incorporates two glass fibre spinners 12A and 12B, and produces the felt 11 in the form of a wool of glass fibres containing a heat hardenable bonding substance.

Figure 2:
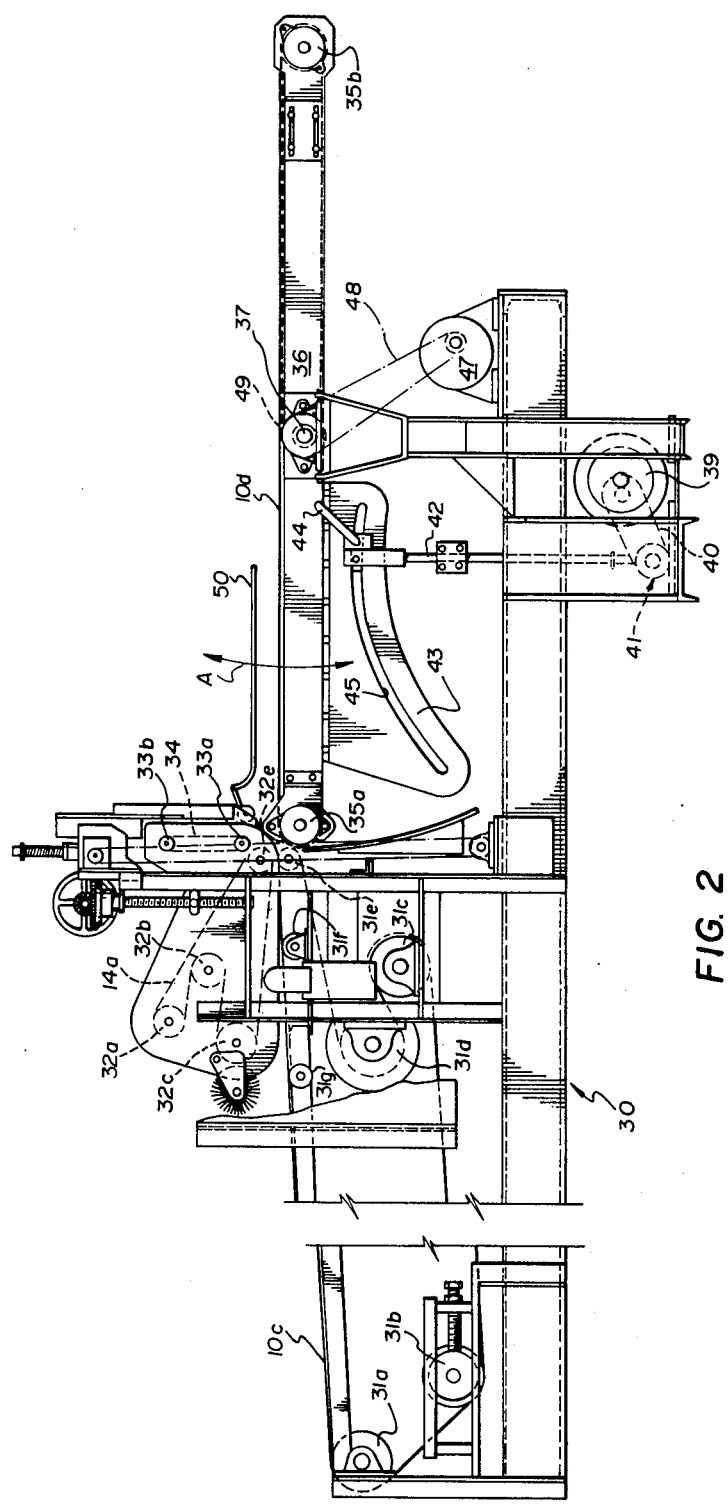
FIG. 2 shows a side view of a pleating apparatus forming part of the production line of FIG. 1.

The felt 11, in its uncured state, is fed from the conveyor 10A, which is associated with the forming hood 12 and over the conveyor 10B, which is downwardly inclined, to the conveyor 10C which, together with conveyor 10D and two endless belts 14A and 14B, form parts of a conventional felt pleater, which is illustrated in greater detail in FIG. 2.

The conveyor 10D is vertically oscillatable, as will be described in greater detail hereinafter, for forming corrugations 15 in the felt, and the endless belt 14B is downwardly inclined, in the direction of advance of the felt 11, and serves to compress the corrugations 15.

From the conveyor 10D, the corrugated and uncured felt passes into a curing section indicated generally by reference numeral 17.

The curing section 17 includes a hot air curing oven 18, which extends around the conveyor 10E and a corresponding endless belt 18 disposed above the path of travel of the felt 11.

Beyond the curing section 17, and above the endless belt conveyor 10F, there is provided a cutting mechanism which comprises a bandsaw 19 having a saw blade 19A.

The bandsaw blade 19A is arranged horizontally so that it extends transversely across the path of travel of the felt 11 in a plane parallel to the major surfaces of the felt 11 and across the entire width of the felt 11. Consequently, the bandsaw blade 19A bisects the felt 11 by severing the felt 11 into two partial felts or mats 11A and 11B.

A pair of hold-down rollers 20A and 20B are provided at opposite sides of the bandsaw 19 and extend transversely across the width of the felt 11 above the conveyor 10F for ensuring that the felt 11 is held in correct alignment with the bandsaw blade 19A.

Beyond the bandsaw 19, a pair of reels 22A and 22B are provided above and below, respectively, the path of travel of the felt for supplying backing strips 23A and 23B to the outer major surfaces of the partial felt or mats 11A and 11B. A pair of spray heads 24A and 24B are provided for spraying adhesive onto the backing strips 23A and 23B before the latter reach the partial felts, the backing strip 23A being pressed against the upper major surface of the partial felt 11A by means of a roller 25, and the backing strip 23B being pressed against the underneath major surface of the partial felt 11B by means of the conveyor 10G.

From the conveyor 10G, the partial felts are fed past a transverse cutting mechanism, indicated generally by reference numeral 26, to a pair of guide rollers 27A and 27B. The transverse cutting mechanism 26, which is of conventional construction, incorporates a cutter blade 26A which is vertically reciprocable for cutting the partial felts 11A and 11B transversely of their widths to required lengths.

Directly before the transverse cutting mechanism 26, a roller 29 is provided for contacting the upper surface of the upper partial felt 11A. The purpose of this roller 29 is to guide the partial felts and to prevent them from being raised by the cutting mechanism 26 during its upward stroke.

At the rollers 27A and 27B, the partial felts 11A and 11B are separated for guidance to two separate take-up roller arrangements, indicated generally by reference numerals 28A and 28B, by means of which the partial felts 11A and 11B are wound into separate coils.

The felt pleater illustrated in FIG. 2, which is given as an example of one of a number of conventional felt pleaters which could be employed in the practicing of the present invention, has a machine frame indicated generally by reference numeral 30, which supports a plurality of guide rollers 31a through 31g for rotation about stationary axes, these rollers 31a through 31g serving to support and guide the endless conveyor belt 10C.

The conveyor belt 14A, which serves to hold down the felt 11 on the upper run of the conveyor belt 10C, is guided around four rollers 32a through 32e.

A further pair of guide rollers 33a and 33b guide a vertical endless belt 34, which is disposed above the outlet end of a gap formed between the belts 10C and 14A for the passage of the felt 11.

Beyond the belt 10C, in the direction of advance of the felt 11, the endless belt 10D is guided about a pair of rollers 35a and 35b, which are rotatably mounted at opposite ends of an oscillatory frame 36.

The frame 36 is mounted for oscillation about the axis of a pivot shaft 37 extending transversely of the belt 10D, and an electric drive motor 39 is connected by a drive chain 40 to a crank mechanism indicated generally by reference numeral 41 for vertically reciprocating a vertical arm 42.

The upper end of the arm 42 is adjustably secured to a vertical plate 43 by means of a manually engageable locking device 44 engaging in an arcuate slot 45 in the plane 43, and is adjustable along the slot 45 for varying the angle of oscillation of the frame 36.

An electric drive motor 47 is connected by a chain and sprocket drive transmission 48 and 49 to the roller 35b, which is rotatable about the shaft 37 for driving the endless belt 10D.

Since this pleater mechanism is of known and conventional construction, it will not be described in greater detail herein.

The operation of the above-described apparatus is as follows.

As the felt 11 advances from the forming hood 12 towards the pleater mechanism, and as a consequence of the normal operation of the forming hood 12, the fibres of the felt 11 extend, in general, longitudinally thereof.

When the felt 11 passes over the conveyor belt 10C of the pleater mechanism shown in FIG. 2, it is held down onto the upper run of the conveyor belt 10C by the hold-down conveyor belt 14A, which is adjustable in height relative to the endless belt 10C. As the felt leaves the gap between the endless belts 10C and 14A, it passes onto the upper run of the endless belt 10D. Meanwhile, the frame 36 is oscillated by the drive motor 47 about the axis of the shaft 37, as indicated by arrow A in FIG. 2, the felt 11 being retained against the endless belt 10D by means of a hold-down plate 50, which is mounted for oscillation with the frame 36.

The oscillation of the belt 10D displaces the felt up and down relative to the vertical endless belt 34, against which the corrugations are formed in the felt 11.

As mentioned hereinbefore, the pleater mechanism is of known and conventional construction, and is given herein simply as an example of a number of known pleating mechanisms which may be employed in the present invention. The operation of this pleating mechanism will therefore be familiar to those skilled in the art, and is not described herein in greater detail.

As the felt leaves the pleating mechanism, the fibres generally have a serpentine array along the felt between the opposite flat sides of the felt as a result of the formation of the corrugations 15.

The speed of the conveyor 10D, and of the following conveyors 10E to 10G, are adjusted relative to the speeds of the conveyors 10A to 10C such that the corrugations 15 are compressed, in the longitudinal direction of the felt 11, against one another.

The endless belt 14B serves as a deflector for holding down the corrugations 15 by preventing the felt from springing upwardly.

In the curing section 17, the conveyor 10E and the upper endless belt 18 are adjusted to a predetermined vertical distance apart from one another in accordance with the required thickness of the cured felt 11, and the felt 11 is cured in a conventional manner as it passes through the curing oven 18.

The bandsaw blade 19A may be adjusted to a position midway between the major surfaces of the felt 11, so that the partial felts 11A and 11B are produced with equal thicknesses, or may be offset towards one of the major surfaces of the felt 11 to provide partial felts of unequal thicknesses.

Although in the present embodiment of the invention, as described above, the backing strips 23A and 23B are applied to the partial felts 11A and 11B beyond the bandsaw 19, it is alternatively possible to apply backing strips to the major surfaces of the felt 11 prior to the arrival of the felt 11 at the curing section 17. In this case, the backing is provided in the form of a porous facing or reinforcement, in order to allow the hot gas to readily permeate and cure the felt 11, and it may not be necessary to apply adhesive to the backing strips before they are applied to the felt 11.

Instead of coiling the partial felts 11A and 11B, as described above, it is alternatively possible to operate the cutter mechanism 25 is such a manner as to cut the partial felts 11A and 11B into shorter lengths corresponding to the circumferences of the pipes to which the heat insulating material is to be applied, and these lengths can then be packaged flat for storage and shipping.

Also, whereas the above-described embodiment of the invention has been described as including the felt forming section 12, it should be understood that the latter does not form an essential part of the present invention, since the present invention can be performed on apparatus removed from the fibre forming section. For example, a roll of uncured wool could be stored and if required, transported, after its manufacture in a forming section, and then fed into the pleating mechanism, cured and cut, as described hereinabove, at a point and time remote from its manufacture in the forming section. Consequently, when employing a forming section of large capacity, and provided for example with eight or 10 spinners, the uncured wool need not necessarily be fed directly to the pleating mechanism, which has a limited throughput capacity.

Figure 3:
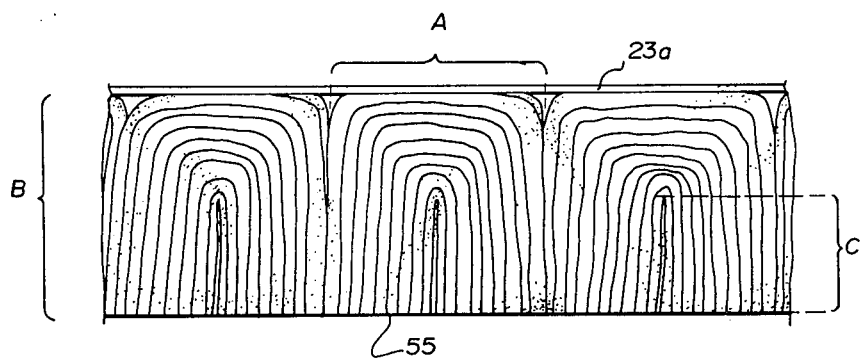
FIG. 3 shows a view taken in transverse section through a piece of heat insulating material formed by the production line of FIG. 1.

FIG. 3 shows a view of part of the partial felt 11A, and more particularly shows, in end view, three adjacent insulating material sections each formed by one-half of one of the corrugations formed in the pleating apparatus of FIG. 2. These sections are of elongate shape, with their lengths extending perpendicular to the plane of FIG. 3, and are bonded together in side-by-side relation by the bonding substance cured in the curing section 17.

Each of these sections comprises a generally U-shaped array of fibres, which is shown diagrammatically in FIG. 3, the fibres at and adjacent one major surface 55 of the finished heat insulating material extending generally perpendicular to the major surface 55.

The opposite major surface of the material is bonded to the backing sheet 23A, and the fibres at and adjacent this opposite major surface are bent, as shown, to extend generally transversely of their respective elongate material section.

In FIG. 3, the width of one of these material sections is indicated by reference A, its height is indicated by reference B, and reference C indicates the distance from the major surface 55 to the nearest point at which the fibres are bent transversely of their respective section.

It will be readily apparent from the above description of the method of manufacturing the material illustrated in FIG. 3 that each of these sections comprises a severed fold, formed in the pleating apparatus of FIG. 2, in the felt 11, and that the width A of this fold or material section will be determined by the initial thickness of the felt 11 and the amount of horizontal compression of the pleats formed by the pleating apparatus.

The height B is determined by the thickness of the initial felt 11 and the sizes of the pleats formed in the pleating mechanism, as also is the distance C.

The density of this product, which is controlled in accordance with the degree of flexibility required in the finished product, is controlled by determining the amount of horizontal and vertical compression of the material fed into and through the curing section 17.

When the finished material is in use, the fibres extending perpendicular to the major surface 55 are compressible, perpendicular to their length, to enable the finished material to flex, e.g. when the material is coiled in a roll or wrapped around a pipe. The fibres which are bent transversely of their sections, at and adjacent the opposite side of the material, i.e. the size bonded to the backing sheet, as described hereinabove, provide resistance to heat flow through the insulating material.

Figure 4:
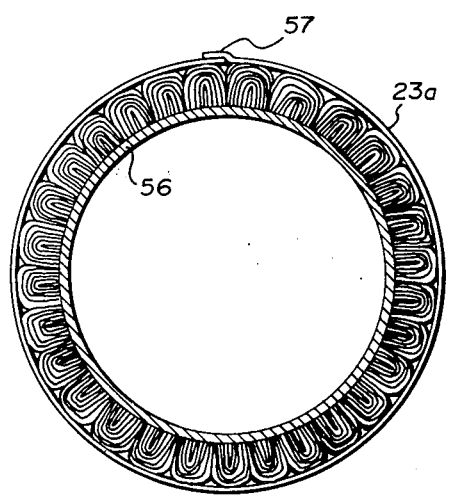
FIG. 4 shows an end view of a pipe wrapped by heat insulating material formed by the production line of FIG. 1.

FIG. 4 diagrammatically illustrates the heat insulating material of FIG. 3 wrapped around a pipe 56. As can be seen from FIG. 4, the heat insulating material is disposed so that the backing sheet 23A is outermost, and with a part of the cured felt cut away so that the backing sheet 23A provides a flap 57 along one edge of the insulating material. The flap 57 is overlapped onto and secured by adhesive to the opposite edge of the backing sheet 23A, as shown, for securing together the adjacent edges of the backing sheet 23A in order to retain the heat insulating material in position around the pipe 56.

At and adjacent the exterior surface of the pipe 56, the fibres extend substantially perpendicular to the pipe surface and are compressed transversely of their lengths to enable the heat insulating material to be flexed, as mentioned above, and thus to be wrapped closely around the pipe 56. However, the fibres at and adjacent the outer major surface of the material, which is bonded to the backing sheet, extend in the peripheral direction, with respect to the pipe, and therefore provide a greater resistance to heat flow radially of the pipe than the fibres extending perpendicularly with respect to the pipe periphery.

We claim:

1. Apparatus for manufacturing a heat insulating material from an uncured, longitudinally advancing strip-shaped felt of fibres containing a heat hardenable bonding substance, the apparatus comprising:
   means for forming in the uncured felt corrugations extending across the entire width of the felt and following one another in succession along the length of the felt;
   means for compressing the corrugated felt in the direction of advance of the felt to press the successive corrugations of the felt against one another;
   a felt curing section for applying heat to the corrugated felt to form a cured felt containing fibres extending in a serpentine array along the felt between opposite flat sides of the felt with the successive corrugations of the felt bonded to one another;
   means for providing a pair of backing sheets secured to outermost portions of the corrugations along the opposite major surfaces of the corrugated felt;
   means for longitudinally cutting the cured felt between and parallel to the backing sheets to separate the cured felt into two partial felts; and
   means for longitudinally conveying the felt along a path of travel extending past the cutting means;
   the cutting means comprising a cutting blade extending transversely across said path of travel, whereby the corrugations are severed so that the fibres form U-shaped arrays disposed in succession along each of the partial felts.

2. Apparatus as claimed in claim 1, wherein said compressing means comprise endless belt means for longitudinally advancing the felt.

3. Apparatus as claimed in claim 1, further comprising two take-up means for separately coiling the partial felts.

4. Apparatus as claimed in claim 1, wherein the felt compressing means comprises a felt deflector inclined towards the path of travel of the felt and in the direction of travel of the felt.

5. Apparatus as claimed in claim 4, wherein the felt deflector comprises an adjustable speed endless belt conveyor.

6. Apparatus for manufacturing a heat insulating material from a longitudinally advancing strip-shaped uncured felt of fibres containing a heat hardenable bonding substance, the apparatus comprising:
- a pleating mechanism for forming in the uncured felt successive corrugations extending across the entire width of the felt to the opposite longitudinal edges of the felt;
- means for compressing the corrugated, uncured felt to press together the successive corrugations;
- a felt curing section comprising means for applying heat to the corrugated felt to cure the bonding substance and thereby bond together the successive corrugations, the felt curing section including means for flattening opposite major surfaces of the corrugated felt, whereby the felt is formed into a cured felt containing fibres extending in a serpentine array along the felt between said surfaces;
- first and second means for applying a pair of backing strips to said major surfaces, respectively;
- means for longitudinally cutting the cured felt to separate the cured felt into two partial felts; and
- conveyor means for longitudinally advancing the felt along a path of travel extending past the pleating mechanism, the compressing means, the felt curing section, and the cutting means;
- the cutting means comprising a cutting blade extending transversely across the path of travel of the felt, whereby the corrugations are severed so that the fibres from U-shaped arrays disposed in succession along each of the partial felts.

7. Apparatus as claimed in claim 6, wherein the felt flattening means includes a pair of parallel endless belt conveyors disposed above and below, respectively, the path of travel of the felt at the felt curing section.

8. A method of manufacturing a heat insulating material from an uncured, longitudinally advancing strip-shaped felt of fibres containing a heat hardenable bonding substance, comprising the steps of:
- forming in the uncured felt successive transverse corrugations extending across the entire width of the felt to the opposite longitudinal edges of the felt;
- compressing the corrugated felt to press together the successive corrugations;
- curing the thus corrugated and compressed felt to cure the bonding substance and thereby bond together the successive corrugations and simultaneously flattening opposite major surfaces of the felt, whereby the felt is formed into a cured felt containing fibres extending in a serpentine array along the felt between said surfaces;
- providing backing sheets secured to said opposite major surfaces; and
- longitudinally cutting the cured felt in a plane extending transversely across the path of travel of the felt and between and parallel to the backing sheets to separate the felt into two partial felts, whereby the corrugations are severed so that the fibres form U-shaped arrays bonded to one another and disposed in succession along each of the partial felts.

9. Heat insulating material, comprising glass fibres bonded together by a heat hardened bonding substance, said heat insulating material having opposite major surfaces and comprising a plurality of elongate material sections bonded together in side-by-side relationship, each of said material sections comprising fibres disposed in a generally U-shaped array with the fibres extending generally perpendicularly from one of said major surfaces at and adjacent said one major substance, and with the fibres bent at and adjacent the opposite major surface of said material to extend transversely of said material section, and a backing sheet bonded to said opposite major surface of said material.

10. Heat insulating material as claimed in claim 9, wherein each of said material sections is formed by a severed fold of a fibre felt, said fold extending longitudinally of said material section.

11. Heat insulating material as claimed in claim 9, wherein said material sections are bonded to one another by said bonding substance.

* * * * *